United States Patent
Yamazaki et al.

(10) Patent No.: US 9,041,325 B2
(45) Date of Patent: May 26, 2015

(54) CONTROL DEVICE FOR ALTERNATING CURRENT MOTOR

(75) Inventors: Akira Yamazaki, Kitakyushu (JP); Kozo Ide, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 539 days.

(21) Appl. No.: 13/407,763

(22) Filed: Feb. 29, 2012

(65) Prior Publication Data

US 2012/0268046 A1   Oct. 25, 2012

(30) Foreign Application Priority Data

Apr. 20, 2011 (JP) ................................. 2011-094076

(51) Int. Cl.
*H02P 21/00* (2006.01)
*H02P 21/14* (2006.01)

(52) U.S. Cl.
CPC .......... *H02P 21/146* (2013.01); *H02P 21/0042* (2013.01); *H02P 2203/11* (2013.01)

(58) Field of Classification Search
USPC ................................. 318/400.01, 400.02, 700
See application file for complete search history.

(56) References Cited

U.S. PATENT DOCUMENTS

| | | | |
|---|---|---|---|
| 5,136,228 A * | 8/1992 | Yamada et al. | 318/808 |
| 6,107,774 A * | 8/2000 | Yamada et al. | 318/807 |
| 7,893,639 B2 * | 2/2011 | Tomigashi | 318/400.21 |
| 8,384,323 B2 * | 2/2013 | Akiyama | 318/400.02 |
| 2005/0242767 A1 * | 11/2005 | Ho | 318/808 |
| 2007/0126391 A1 * | 6/2007 | Tobari et al. | 318/717 |
| 2009/0237015 A1 * | 9/2009 | Hashimoto et al. | 318/400.02 |
| 2009/0315495 A1 * | 12/2009 | Yasui | 318/400.34 |
| 2010/0094505 A1 * | 4/2010 | Kariatsumari et al. | 701/41 |
| 2011/0175560 A1 * | 7/2011 | Akiyama | 318/400.32 |

FOREIGN PATENT DOCUMENTS

| | | |
|---|---|---|
| JP | 08-308292 | 11/1996 |
| JP | 2001-086788 | 3/2001 |
| JP | 2001-161099 | 6/2001 |
| JP | 2007-300780 | 11/2007 |
| JP | 2008-092649 | 4/2008 |
| JP | 2009-136085 | 6/2009 |
| JP | 2009-291072 | 12/2009 |

OTHER PUBLICATIONS

Japanese Decision of a Patent Grant for corresponding JP Application No. 2011-094076, Oct. 15, 2013.

* cited by examiner

*Primary Examiner* — Kawing Chan
(74) *Attorney, Agent, or Firm* — Mori & Ward, LLP

(57) ABSTRACT

A control device for an alternating current motor according to embodiments includes a current distributor and a phase estimator. The current distributor divides a torque command by using a control phase and outputs a component that contributes to a mechanical output of the motor as a δ-axis current command and a component that does not contribute to the mechanical output as a γ-axis current command. The phase estimator computes a phase at which a γ-axis component of an addition amount of the output of the current controller and a voltage drop amount of inductance of the motor becomes zero and outputs the computed phase as the control phase.

17 Claims, 10 Drawing Sheets

CONTROL DEVICE FOR ALTERNATING CURRENT MOTOR

CROSS-REFERENCE TO RELATED APPLICATION

This application is based upon and claims the benefit of priority of the prior Japanese Patent Application No. 2011-94076, filed on Apr. 20, 2011, the entire contents of which are incorporated herein by reference.

FIELD

The embodiments discussed herein are directed to a control device for an alternating current motor.

BACKGROUND

A power conversion control device has been known as an example of a device that drives an alternating current motor, such as a synchronous machine, a reluctance machine, an induction machine, or an induction-synchronous machine, without a position sensor. The alternating current motor has been known as disclosed in, for example, Japanese Laid-open Patent Publication No. 2007-300780. The power conversion control device includes a power converter, a current detector, a frequency calculation unit that determines an operating frequency of the power converter, an integration calculation unit that calculates and outputs a phase angle signal from an output of the frequency calculation unit through an integral operation, an orthogonal two-axis conversion unit, a two-axis current control unit, a PWM signal generating unit, and a PWM controller that controls the power converter in accordance with a PWM signal.

The orthogonal two-axis conversion unit calculates and outputs a two-axis current that has an active component and a reactive component by performing orthogonal two-axis conversion on the basis of the detection signal of the current detector and the phase angle signal of the integration calculation unit. A two-axis current setting unit outputs a current command value of the active component and a current command value of the reactive component of the two-axis current. The two-axis current control unit calculates an amount of an error from a difference between the output of the orthogonal two-axis conversion unit and the output of the two-axis current setting unit, and outputs a voltage magnitude command value according to the amount of an error for each two-axis component. The PWM signal generating unit generates a PWM signal for controlling the power converter on the basis of the output of the two-axis current control unit and the phase angle signal of the integration calculation unit. Then, in order that the position sensor may not be indispensable, the frequency calculation unit determines the operating frequency of the power converter to guide a reactive component-axis voltage magnitude command value to zero among the voltage magnitude command values that are the output of the two-axis current control unit.

The conventional power conversion control device realizes a high-efficiency operation by a simple command operation without using a position and speed sensor by employing such a configuration.

The conventional power conversion control device has few control parameters, which are required for high-efficiency control. However, for example, the active component-axis voltage magnitude command value that is the output of the two-axis current control unit is a value that is obtained by multiplying it by a gain value KG that is an inverse number of an induced voltage constant obtained from the reactive component-axis voltage magnitude command value. Moreover, it is preferable that the gain value KG is determined as the operating frequency of the power converter. Japanese Laid-open Patent Publication No. 2007-300780 further discloses that a speed estimation method is performed in consideration of the size of a voltage drop caused by wirewound resistance and inductance. Herein, an electric motor constant is directly used or an electric motor constant is simply replaced by a gain value Kγ.

Furthermore, it is assumed that the two-axis current setting unit controls an electric motor in which an induced voltage is basically larger than the size of a voltage drop caused by wirewound resistance and inductance and thus an angle (phase difference angle β) formed by a voltage vector and the q axis perpendicular to a magnetic flux component axis (d axis) becomes small, that is to say, an electric motor in which a command value can be determined and a reactive power can be ignored in such a manner that a power factor is "1" basically. The setting method of the γ-axis current Iγ directly using an electric motor constant and a power factor angle β is disclosed. In the setting method, it is required to vary a control gain in accordance with an operating state, or a computation method of a current command becomes complicated.

In this way, Japanese Laid-open Patent Publication No. 2007-300780 assumes that a control target is an electric motor that basically uses a permanent magnet. Therefore, when a control target is an electric motor that is not easily operated like a synchronous reluctance motor when the power factor is "1" or an electric motor in which the variation of a motor characteristic is large, it is hard to say that two operations of a position sensorless operation and a simple high-efficiency operation can be compatible.

SUMMARY

A control device for an alternating current motor according to an aspect of embodiments includes a current distributor, a current controller, a voltage drop calculator, a voltage commander, a phase estimator, and an inverter circuit. The current distributor divides a torque command for the alternating current motor by using a control phase and outputs a component that contributes to a mechanical output of the alternating current motor as a δ-axis current command and a component that does not contribute to the mechanical output as a γ-axis current command. The current controller performs a control in such a manner that the δ-axis current command and the γ-axis current command are respectively identical with a δ-axis current and a γ-axis current flowing into the alternating current motor. The voltage drop calculator calculates a voltage drop amount of inductance and wirewound resistance of the alternating current motor. The voltage commander outputs a voltage command for the alternating current motor on the basis of the output of the current controller and the output of the voltage drop calculator. The phase estimator computes at least one of a phase at which a γ-axis component of an addition amount of the output of the current controller and a voltage drop amount of the inductance of the alternating current motor becomes zero and a phase at which a δ-axis component obtained by integrating the addition amount becomes zero and outputs the computed phase as the control phase. The inverter circuit applies a voltage based on the voltage command to the alternating current motor.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

Figure 1:
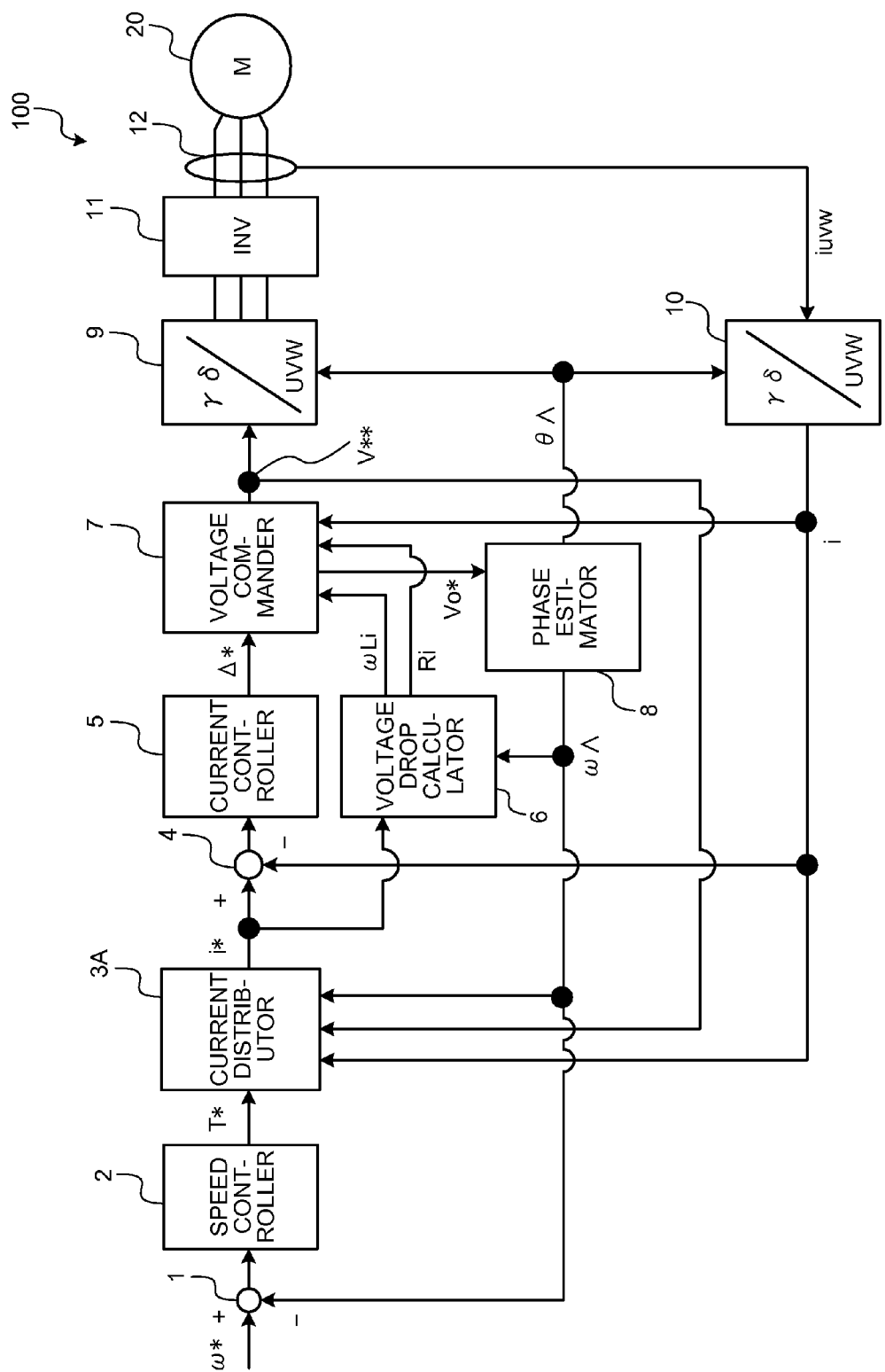
FIG. 1 is a total control block diagram of a control device for an alternating current motor according to a first embodiment.

Before specific operations of embodiments are explained, fundamental explanations on the embodiments are performed.

(Control Coordinate System)

A voltage equation of an alternating current motor that is a control target in the present embodiments is expressed by Equation (1).

$$\begin{bmatrix} vd \\ vq \end{bmatrix} = \begin{bmatrix} R+pLd & -\omega \cdot Lq \\ \omega \cdot Ld & R+pLq \end{bmatrix} \begin{bmatrix} id \\ iq \end{bmatrix} + \begin{bmatrix} 0 \\ \omega \cdot \phi m \end{bmatrix} \quad (1)$$

A voltage vo(vod, voq) corresponding to a back electromotive force of the alternating current motor in a steady state (current derivation 0) is expressed by Equation (2), which is obtained by subtracting a voltage drop amount Ri(R·id, R·iq) at wirewound resistance R from an applied voltage v(vd, vq) applied to the alternating current motor.

$$\begin{bmatrix} vod \\ voq \end{bmatrix} = \begin{bmatrix} vd - R \cdot id \\ vq - R \cdot iq \end{bmatrix} = \begin{bmatrix} -\omega \cdot Lq \cdot iq \\ \omega \cdot Ld \cdot id + \omega \cdot \phi m \end{bmatrix} \quad (2)$$

A generation torque T of the electric motor is expressed by the synthesis of a magnet torque (first term) and a reluctance torque (second term) and is computed by Equation (3).

$$T = \frac{3}{2}P\{\phi m \cdot iq + (Ld-Lq)id \cdot iq\} \quad (3)$$

Moreover, because a main magnetic flux caused by a permanent magnet does not exist when a control target is a synchronous reluctance motor, it is only sufficient that $\phi m=0$ in the Equation (3).

Moreover, an apparent power S that is the input of the electric motor is computed by using an active power P and a reactive power Q as indicated by Equation (4).

$$S=\sqrt{P^2+Q^2} \quad (4)$$

The active power P is expressed by Equation (5) indicated by the synthesis of a copper loss (Joule loss) caused by wirewound resistance and a mechanical output Po and the reactive power Q is expressed by Equation (6). However, an iron loss is not considered.

$$P = vd \cdot id + vq \cdot iq \quad (5)$$
$$= R(id^2 + iq^2) + \frac{3}{2}P\omega\{\phi m \cdot iq + (Ld-Lq)id \cdot iq\}$$

$$Q = vq \cdot id - vd \cdot iq = \omega(Ld \cdot id^2 + Lq \cdot iq^2) \quad (6)$$

An electric power Po obtained by subtracting the copper loss from the active power P is expressed by Equation (7) and is an electric power that consists of only the mechanical output Po.

$$Po = (vd - R \cdot id) \cdot id + (vq - R \cdot iq) \cdot iq \quad (7)$$
$$= \frac{3}{2}P\omega\{\phi m \cdot iq + (Ld-Lq)id \cdot iq\}$$

Herein, it is assumed that a control axis, of which the component contributing to the mechanical output of the alternating current motor is a δ-axis component and the component not contributing to the mechanical output is a γ-axis component, is defined and the γ-axis component of the voltage, which is obtained by subtracting a voltage drop amount at the wirewound resistance R from the applied voltage applied to the alternating current motor, is zero. This means that a γ-axis voltage Vγ and a γ-axis current iγ obtained by performing coordinate conversion on the Equation (2) define a γ-δ axis that satisfies the relationship of Equation (8).

$$v\gamma - R \cdot i\gamma = 0 \quad (8)$$

In the present embodiments, the alternating current motor is driven by using the γ-δ axis defined in this way as a control axis.

(Robust Control, High-efficiency Control)

A conventional control by which a current vector phase is controlled in such a manner that a voltage vector is identical with the control axis or by which a voltage vector phase is controlled in such a converse manner that a current vector is identical with the control axis results in a power factor control. When an alternating current motor that is a control target is a motor such as a permanent magnet type motor in which an armature reaction can be substantially ignored with respect to an induced voltage, the control is comparatively easily performed because a power factor can be substantially controlled to be "1". However, an electric motor such as a synchronous reluctance motor that does not generate an induced voltage cannot easily perform a power factor control.

When a control target is a synchronous reluctance motor, the inductance value of the motor is largely changed depending on a load torque. In order to realize a maximum efficiency operation regardless of the load torque, it is required to preliminarily measure an inductance value by using a load torque function and then to embed the characteristic value as a table or an approximated function, for example, or perform a complicated calculation.

However, when the γ-δ axis is indicated as a control axis, although the sign of a current vector phase is reversed during play and replay, the size can approximate a substantially constant value, regardless of an operating condition such as for example a load torque and the number of rotations.

Therefore, assuming that the γ-δ axis is a control axis, when an electric motor that uses a permanent magnet, that is to say, an electric motor that can control a reactive power to be substantially zero is a control target, a high-efficiency operation can be realized by only performing a control in such a manner that a γ axis-component current becomes zero, that is to say, a current vector is identical with a δ-axis direction.

Furthermore, when a control target is an electric motor, such as a synchronous reluctance motor that does not use a permanent magnet, in which a power factor is originally bad and a reactive power cannot be controlled to be zero, a high-efficiency operation can be performed by only performing a control in such a manner that an electric current is applied at a phase of $\pi/4$ to a reactance voltage $\omega Li$, that is to say, a current vector becomes $\pi/4$ with respect to the γ axis. This reason is that the phase of the current vector for performing a high-efficiency operation is substantially determined by a ratio of a component that comes from the permanent magnet and a component that comes from the reluctance torque included in the generation torque and also the ratio becomes $\pi/4$ when the motor is a synchronous reluctance motor that does not use a permanent magnet.

Moreover, in the case of an electric motor that has a middle characteristic between them, a high-efficiency operation can be performed by setting a ratio of a mechanical output to an input power as the phase of a current vector.

In this way, the control is performed in such a manner that the Equation (8) is accomplished, that is to say, a voltage command vector vo* obtained by subtracting the size of a voltage drop caused by the wirewound resistance from the applied voltage applied to the alternating current motor is identical with the δ-axis direction (the γ-axis component becomes zero), or in such a manner that a stator flux $\phi s$ is identical with the γ-axis direction (the δ-axis component becomes zero). As a result, even if an alternating current motor that cannot easily perform a power factor control is a control target, a robust control can be performed against the variation of a motor characteristic.

Moreover, the embodiments to be explained below can realize a further high-efficiency operation by a maximum-efficiency control by which a δ axis-component power to an input power becomes maximum.

Hereinafter, the embodiments will be explained with reference to the diagrams. Moreover, the same components have the same reference numbers and overlapping explanations are appropriately omitted. In the following explanations, a signal that has two elements of a γ axis and a δ axis is referred to as a vector and the vector is indicated by a thick line in the drawing.

First Embodiment

First, the configuration of a control device for an alternating current motor according to the first embodiment will be explained with reference to FIG. 1. FIG. 1 is a total control block diagram of a control device 100 for an alternating current motor according to the first embodiment.

As illustrated in FIG. 1, the control device 100 for an alternating current motor according to the present embodiment includes subtractors 1 and 4, a speed controller 2, a current distributor 3A, a current controller 5, a voltage drop calculator 6, a voltage commander 7, a phase estimator 8, a coordinate converter 9, an inverse coordinate converter 10, an inverter circuit 11, and a current detector 12. The control device 100 drives an alternating current motor 20 as a control target.

The subtractor 1 computes a difference between a speed command $\omega^*$ provided from the outside (not illustrated) and a speed estimation $\omega_\wedge$ provided from the phase estimator 8 and outputs the difference to the speed controller 2 as a speed error.

The speed controller 2 outputs a torque command T* that is a control output to the current distributor 3A in such a manner that the speed error provided from the subtractor 1 becomes zero. For example, the speed controller 2 performs a proportion and integral control.

The current distributor 3A computes a current command vector i*(iγ*, iδ*) by using the torque command T* provided from the speed controller 2 and outputs the current command vector to the subtractor 4 and the voltage drop calculator 6. Moreover, the current distributor 3A corrects an amount on a command load angle to be described below by using the torque command T*, the speed estimation $\omega_\wedge$ provided from the phase estimator 8, a second voltage command vector v(vγ, vδ**) provided from the voltage commander 7, and a current vector i(iγ, iδ) provided from the inverse coordinate converter 10. The details are described below.

The subtractor 4 computes a difference between the current command vector i* provided from the current distributor 3A and the current vector i provided from the inverse coordinate converter 10 and outputs the difference to the current controller 5 as a current error.

The current controller 5 outputs a voltage vector $\Delta^*(\Delta\gamma^*, \Delta\delta^*)$ that is a control output to the voltage commander 7 for each of the γ and δ axes in such a manner that the current error provided from the subtractor 4 becomes zero. For example, the current controller 5 performs a proportion and integral control.

The voltage drop calculator 6 computes a $\omega Li$ compensation voltage on the inductance of the alternating current motor 20 and an Ri compensation voltage on the wirewound resistance and outputs the voltages to the voltage commander 7 in such a manner that the voltage vector $\Delta^*$ that is the output of the current controller 5 becomes small. This is performed for the sake of noninterference for preventing mutual interference between the γ and δ axes, and the $\omega Li$ compensation voltage and the Ri compensation voltage are calculated by using the current command vector i* provided from the current distributor 3A and the speed estimation $\omega_\wedge$ provided from the phase estimator 8.

The voltage commander 7 receives the voltage vector $\Delta^*$ provided from the current controller 5, the $\omega Li$ compensation voltage and the Ri compensation voltage provided from the voltage drop calculator 6, and the current vector i provided from the inverse coordinate converter 10. The voltage commander 7 outputs the second voltage command vector v** to the coordinate converter 9 and a voltage vector vo*(voγ*, voδ*) for phase estimation to the phase estimator 8 as a voltage command for the alternating current motor 20. The details are described below.

The phase estimator 8 computes a control phase θ∧ and the speed estimation ω∧ by using the voltage vector vo* provided from the voltage commander 7. The control phase θ∧ is output to the coordinate converter 9 and the inverse coordinate converter 10. The speed estimation ω∧ is output to the subtractor 1, the current distributor 3A, and the voltage drop calculator 6. The details are described below.

The coordinate converter 9 converts the second voltage command vector v** provided from the voltage commander 7 into a three-phase uvw coordinate voltage command vector vuvw*(vu*, vv*, vw*) by using the control phase θ∧ provided from the phase estimator 8, and outputs the converted vector to the inverter circuit 11.

The inverse coordinate converter 10 converts a uvw coordinate current vector iuvw(iu, iv, iw) provided from the current detector 12 into the current vector i of the γ-δ coordinate system by using the control phase θ∧ provided from the phase estimator 8, and outputs the converted voltage to the current distributor 3A, the subtractor 4, and the voltage commander 7.

The inverter circuit 11 applies a voltage based on the uvw coordinate voltage command vector vuvw* provided from the coordinate converter 9 to the alternating current motor 20 to drive the alternating current motor 20.

The current detector 12 detects a phase current of the alternating current motor 20 and outputs the detected phase current to the inverse coordinate converter 10 as the uvw coordinate current vector iuvw.

Next, the current distributor 3A, the voltage commander 7, and the phase estimator 8 are sequentially explained with reference to the diagrams.

(Explanation on Current Distributor 3A)

Figure 2:
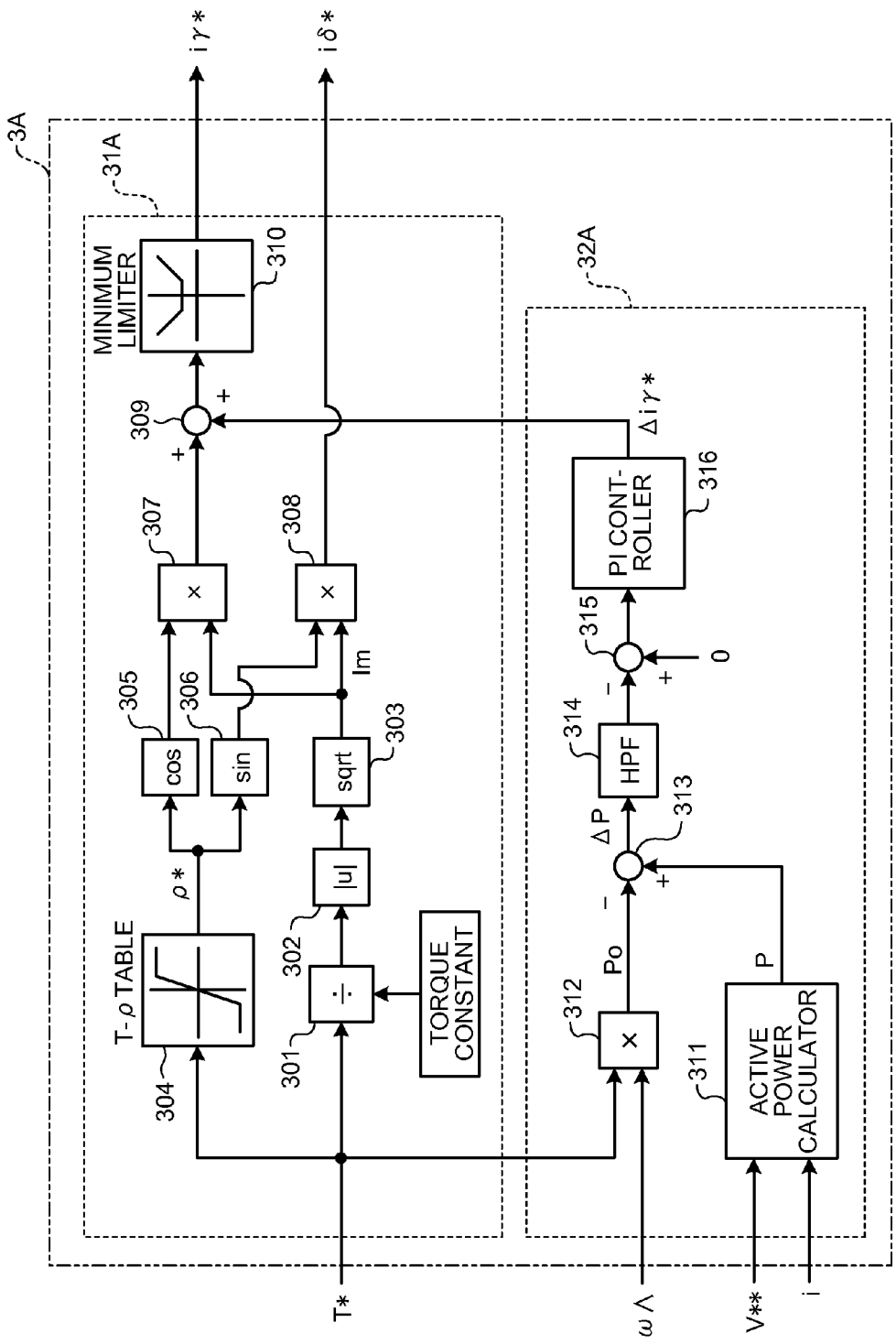
FIG. 2 is a control block diagram of a current distributor according to the first embodiment.

FIG. 2 is a control block diagram illustrating the configuration of the current distributor 3A. As illustrated in FIG. 2, the current distributor 3A includes a distribution unit 31A and a correction unit 32A.

The distribution unit 31A includes a divider 301, an absolute value calculator 302, a square root calculator 303, a T-ρ table 304, a cosine calculator 305, a sine calculator 306, multipliers 307 and 308, an adder 309, and a minimum limiter 310. The correction unit 32A includes an active power calculator 311, a multiplier 312, a subtractor 313, a high-pass filter 314, a subtractor 315, and a proportional integral controller 316.

The divider 301 divides the torque command T* provided from the speed controller 2 by a predetermined value (torque constant) to compute a current command. The absolute value calculator 302 calculates an absolute value of the current command. The square root calculator 303 computes a square root of the absolute value as a current command amplitude Im.

The processes of the divider 301, the absolute value calculator 302, and the square root calculator 303 are performed on the basis of an equation for computing the current command amplitude Im from the torque command T* in the synchronous reluctance motor.

The T-ρ table 304 computes a command load angle ρ* to the torque command T* with reference to a table that is preliminarily prepared. The T-ρ table 304 has a characteristic illustrated in FIGS. 9A and 9B, for example.

Figure 9A:
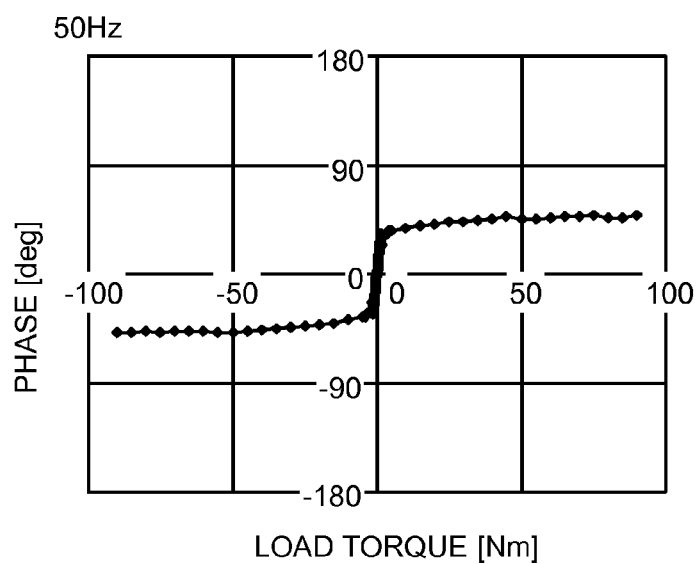
FIGS. 9A and 9B is a diagram explaining a relationship between a load torque at a maximum-efficiency operation and a stator flux axis-based current vector phase.
Figure 9B:
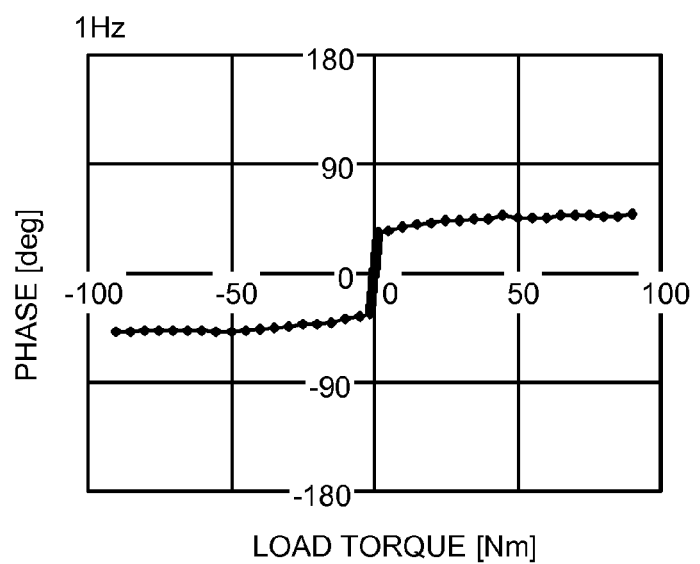

FIGS. 9A and 9B is a diagram explaining a relationship between a load torque (horizontal axis) and a stator flux axis-based current vector phase (vertical axis) under a condition that the synchronous reluctance motor operates at the maximum efficiency on the γ-δ axis. The cases where operating frequencies are 50 Hz and 1 Hz are illustrated in FIGS. 9A and 9B. As will be appreciated from FIGS. 9A and 9B in the relationship of the command load angle ρ* to the torque command T*, when the synchronous reluctance motor is a control target, the present embodiment can be performed even if the current vector phase is zero-crossed at the time of no-load, the sign is reversed during play and replay, and the size approximates a substantially constant value (π/4) regardless of an operating frequency, that is to say, the number of rotations.

Particularly, if it is required to more strictly perform a maximum-efficiency control, it is only sufficient that the present embodiment can be configured to perform a correction by using a γ-axis current command correction amount Δiγ* and a phase correction angle Δρ* provided from the correction unit 32A.

Returning to FIG. 2, the cosine calculator 305 and the sine calculator 306 respectively compute a cosine value and a sine value to the command load angle ρ*.

The multiplier 307 and the multiplier 308 respectively multiply the cosine value and the sine value by the command amplitude Im to compute a γ-axis component iγ* and a δ-axis component iδ* of the current command vector i*.

The adder 309 adds the γ-axis current command correction amount Δiγ* provided from the correction unit 32A to be described below to the γ-axis component iγ* of the current command vector i* to correct the component.

When the alternating current motor 20 is a synchronous reluctance motor, because a magnetic flux does not occur and thus a torque does not occur when a γ-axis current command iγ* is zero, the minimum limiter 310 is a limiter that is provided to prevent this and computes the output of the limit process as the final γ-axis current command iγ*. In this way, the distribution unit 31A compute the current command vector i*.

The active power calculator 311 computes the active power P by using the second voltage command vector v** provided from the voltage commander 7 and the current vector i provided from the inverse coordinate converter 10, for example, by using the Equation (5).

The multiplier 312 multiplies the torque command T* provided from the speed controller 2 by the speed estimation ω∧ provided from the phase estimator 8 to computes the mechanical output Po.

The subtractor 313 subtracts the mechanical output Po from the active power P to compute a power difference ΔP. The power difference ΔP includes the copper loss of the alternating current motor 20.

The high-pass filter 314 extracts a vibrational component signal that is obtained by cutting a low-frequency band from the power difference ΔP. The subtractor 315 subtracts the vibrational component signal from a predetermined value (zero) to reverse the sign of the vibrational component signal and outputs the result.

The proportional integral controller 316 performs, for example, a proportional integral control in such a manner that the vibrational component signal that has the reversed sign becomes zero, and outputs the control output as the γ-axis current command correction amount Δiγ*. In this way, the correction unit 32A computes and outputs the γ-axis current command correction amount Δiγ* to the adder 309 of the distribution unit 31A. Moreover, the adder 309 adds the γ-axis current command correction amount Δiγ* to the γ-axis current command iγ* to correct it.

In this way, the embodiment has a configuration that the γ-axis current command iγ* is corrected by the γ-axis current command correction amount Δiγ* that is calculated in such a manner that the power difference ΔP becomes the minimum by using the vibrational component when the alternating current motor 20 operates, that is to say, a change amount of the power difference ΔP to a load angle variation. Because a corrected amount of the configuration is based on an electric current dimension, it is convenient that the electric current dimension is identical with the output signal dimension of the distribution unit 31A and the limit value of the minimum limiter 310 is easily set.

The γ-axis current command correction amount Δiγ* is corrected to the γ-axis current command iγ*. This performs the same operation as an operation for operating the command load angle ρ* in such a manner that the δ-axis component power to the input power becomes the maximum. The correction unit 32A may perform a calculation by using the correction angle Δρ to the command load angle ρ* to directly correct the command load angle. In this case, the configuration of the correction unit 32A may not be changed. Therefore, it is only sufficient that the correction unit 32A additionally has a unit conversion factor, which indicates the change from an electric current dimension to a phase angle dimension, and adds the unit conversion factor to the command load angle ρ* output from the T-ρ table 304.

Herein, the configuration of the current distributor 3A has been explained with reference to FIG. 2. This configuration is a configuration that is optimized to the synchronous reluctance motor as a control target. However, even if a control target is a permanent magnet motor or an induction motor, the configuration can be simplified and changed without departing from the scope of the operating situation.

For example, it has been explained that the current vector phase that uses the γ-δ axis as a control axis may approximate π/4 in the synchronous reluctance motor. However, when an electric motor such as a permanent magnet type motor is a control target, it is not necessary to compute a zero-cross command load angle at the time of no-load. For this reason, it is assumed that the command load angle is π/2 without using the T-ρ table 304. It is possible to omit the absolute value calculator 302 and the square root calculator 303 when the current amplitude value Im is computed. Furthermore, because the permanent magnet type motor generates a magnetic flux even when the γ-axis current command is zero, the minimum limiter 310 can be also omitted.

If a cutoff frequency of the high-pass filter 314 and a control gain of the proportional integral controller 316 are varied when a frequency of phase fluctuation is changed depending on an operating condition, it is further effective because an estimation precision of an optimum phase can be efficiently improved.

In this way, the current distributor 3A is constituted and thus a high efficiently operating command load angle can be estimated with respect to an estimated error of the control axis caused by a setting error of the wirewound resistance of the alternating current motor 20 and a variation of a motor characteristic depending on a load condition. Therefore, an effect of a high-efficiency operation can be more raised.

(Explanation on Voltage Commander 7)

Figure 3:
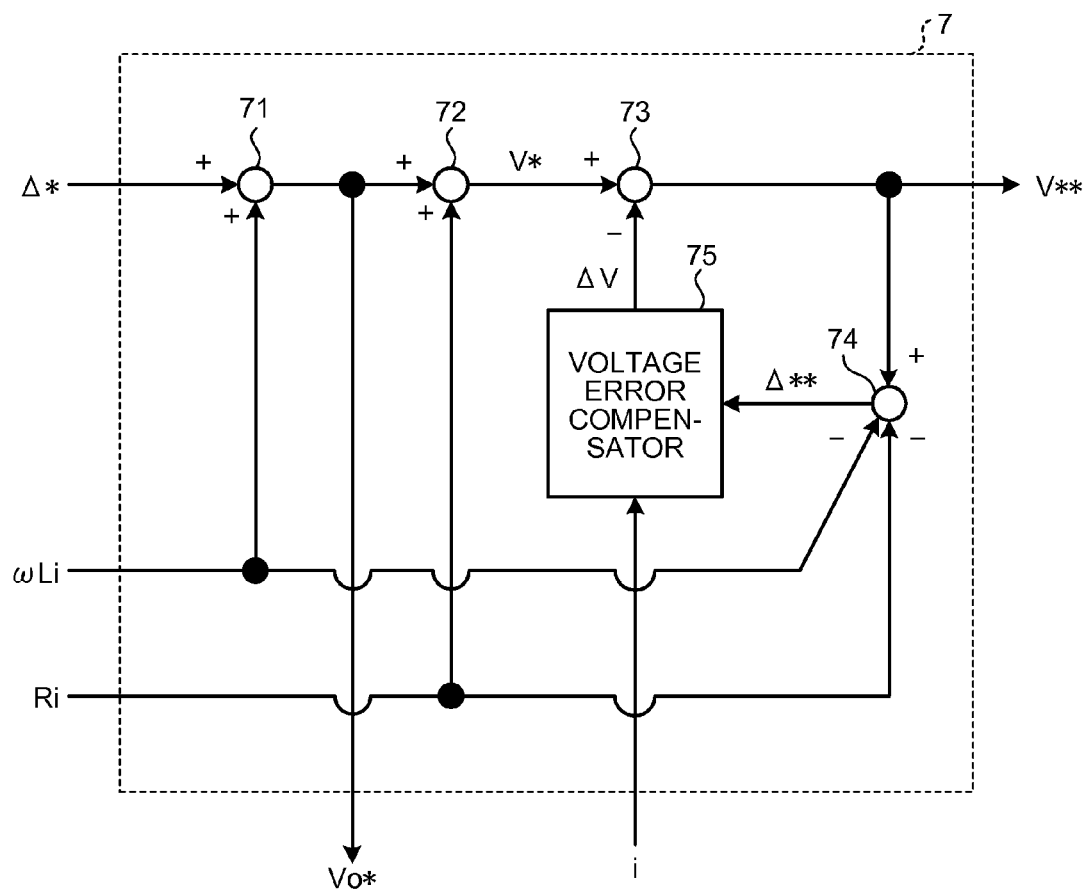
FIG. 3 is a control block diagram of a voltage commander according to the first embodiment.
Figure 4:
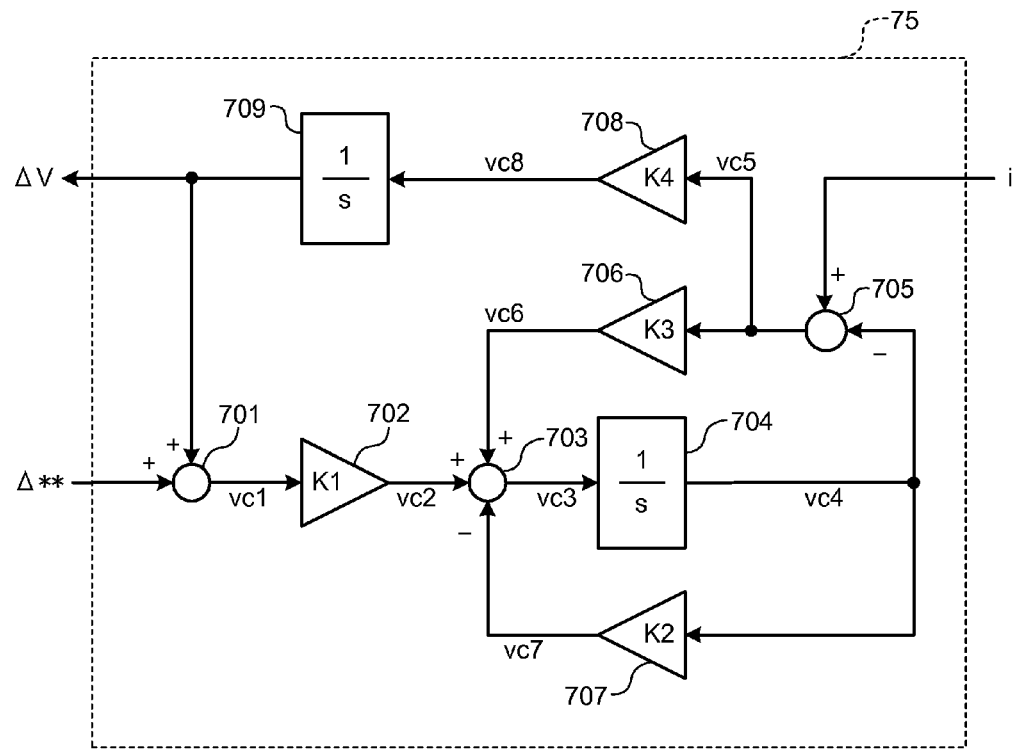
FIG. 4 is a control block diagram of a voltage error compensator according to the first embodiment.

FIG. 3 is a control block diagram illustrating the configuration of the voltage commander 7. FIG. 4 is a control block diagram of a voltage error compensator 75 included in the voltage commander 7. As illustrated in FIG. 3, the voltage commander 7 includes adders 71 and 72, subtractors 73 and 74, and the voltage error compensator 75. As illustrated in FIG. 4, the voltage error compensator 75 includes an adder 701, a first coefficient multiplier 702, an adder 703, an integrator 704, a subtractor 705, a third coefficient multiplier 706, a second coefficient multiplier 707, a fourth coefficient multiplier 708, and an integrator 709.

The adder 71 adds the voltage vector Δ* provided from the current controller 5 to the ωLi compensation voltage provided from the voltage drop calculator 6 to compute the voltage vector vo*, and outputs the result to the adder 72.

The adder 72 adds the voltage vector vo* provided from the adder 71 to the Ri compensation voltage provided from the voltage drop calculator 6 to compute a voltage command vector v*, and outputs the result to the subtractor 73.

The subtractor 73 computes a difference between the voltage command vector v* provided from the adder 72 and a voltage error Δv provided from the voltage error compensator 75, and outputs the difference to the subtractor 74, the current distributor 3A, and the coordinate converter 9 as the second voltage command vector v**.

The subtractor 74 subtracts the ωLi compensation voltage and the Ri compensation voltage provided from the voltage drop calculator 6 from the second voltage command vector v provided from the subtractor 73, and outputs the result to the voltage error compensator 75 as a voltage vector Δ. The voltage vector Δ** may be computed by subtracting the voltage error Δv provided from the voltage error compensator 75 from the voltage vector Δ* provided from the current controller 5.

Next, the voltage error compensator 75 is explained with reference to FIG. 4.

The adder 701 adds the voltage vector Δ** provided from the subtractor 74 to a previous calculation value (previous value of the voltage error Δv) of the integrator 709 of the voltage error compensator 75, and outputs the result as vc1. The first coefficient multiplier 702 multiplies the vc1 by a predetermined value (coefficient corresponding to a first gain K1) and outputs the result as vc2.

The adder 703 adds the vc2 to a previous value of vc6 to be described below and further subtracts a previous value of vc7 to be described below from the added value to output the result as vc3. The integrator 704 integrates the vc3 and outputs the result as vc4. The second coefficient multiplier 707 multiplies the vc4 by a predetermined value (coefficient corresponding to a second gain K2) and outputs the result as the vc7.

The subtractor 705 subtracts the vc4 from the current vector i provided from the inverse coordinate converter 10 and outputs the result as vc5. The third coefficient multiplier 706 multiplies the vc5 by a predetermined value (coefficient corresponding to a third gain K3) and outputs the result as the vc6. The fourth coefficient multiplier 708 multiplies the vc5 by a predetermined value (coefficient corresponding to a fourth gain K4) and outputs the result as vc8.

The integrator 709 integrates the vc8 to compute the voltage error Δv.

Moreover, the first to the fourth gains (K1 to K4) are a two-by-two matrix that are respectively based on Equations (9) to (12). Moreover, a response frequency ωv and a damping coefficient in the equation are design values for determining a response of the voltage error compensator 75, Ldq is a diagonal matrix that has d-axis inductance Ld value and q-axis inductance Lq value as elements, and R is scalar matrix that has wirewound resistance values as elements. Moreover, the Ld value is used as a compensation gain of the γ-axis component and the Lq value is used as a compensation gain of the δ-axis component.

$$K1 = \frac{1}{Ldq} \tag{9}$$

$$K2 = \frac{R}{Ldq} \quad (10)$$

$$K3 = 2\omega v \cdot \xi - \frac{R}{Ldq} \quad (11)$$

$$K4 = Ldq \cdot \omega v^2 \quad (12)$$

With respect to a voltage required by the current controller 5 to realize a response ($\omega v$: response frequency and $\zeta$: damping coefficient) according to a design value, the voltage error compensator 75 computes the voltage error $\Delta v$ in such a manner that an estimated current vector (corresponding to vc4) computed by an electrical model consisting of inductance and wirewound resistance of the alternating current motor 20 is identical with an error current vector (corresponding to vc5) of the current vector provided from the inverse coordinate converter 10. Moreover, the electrical model employs one that approximates a quadratic expression. However, the electrical model is not limited to the quadratic expression.

As a result, even if the motor characteristic of the alternating current motor 20 that is a control target is largely varied and mutual interference caused by inductance between the $\gamma$ and $\delta$ axes occurs, the voltage error compensator 75 can suppress the instability of the current controller 5 and can realize a control response according to a design without reducing a noninterference function between the $\gamma$ and $\delta$ axes of the voltage drop calculator 6. The voltage error compensation performed by the voltage error compensator 75 is effective regardless of the structure of the alternating current motor 20 and the definition of the control axis.

Moreover, because a control response of the current controller 5 can be performed according to the design value, a response design of the phase estimator 8 and the speed controller 2 does not require consideration on the variation of current control response and the control interference between controllers of the phase estimator 8 and the speed controller 2. Furthermore, a control response design can be performed at high speed and with ease.

(Explanation on Phase Estimator 8)

Figure 5:
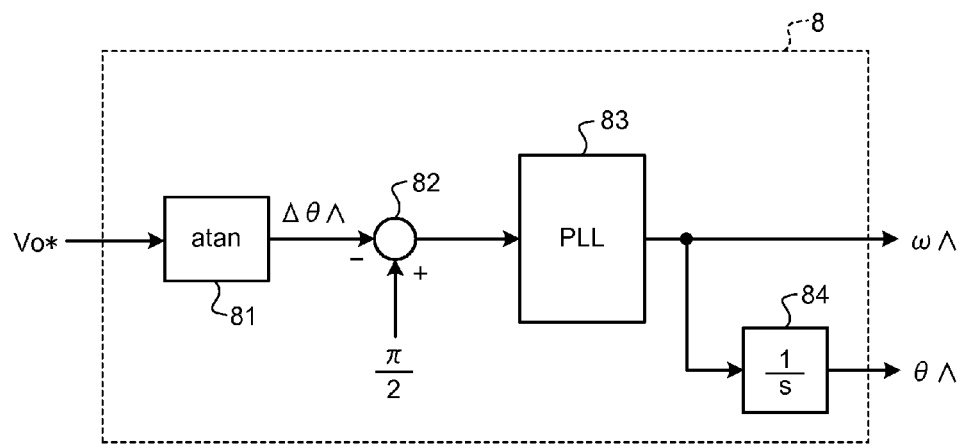
FIG. 5 is a control block diagram of a phase estimator according to the first embodiment.

FIG. 5 is a control block diagram illustrating the configuration of the phase estimator 8. As illustrated in FIG. 5, the phase estimator 8 includes an arctan calculator 81, a subtractor 82, a PLL calculator 83, and an integrator 84.

The arctan calculator 81 computes a phase error $\Delta\theta\wedge$ on the basis of Equation (13) by using the voltage vector vo* provided from the voltage commander 7.

$$\Delta\theta\wedge = a\,\tan\!\left(\frac{vo\delta *}{vo\gamma *}\right) \quad (13)$$

The subtractor 82 computes a difference between the predetermined value ($\pi/2$) and the phase error $\Delta\theta\wedge$. The PLL calculator 83 receives the difference, performs a control in such a manner that the phase error $\Delta\theta\wedge$ converges on the predetermined value ($\pi/2$) through a PLL calculation performed by, for example, the proportional integral control that has been known until now, and outputs the control output as the speed estimation $\omega\wedge$.

The integrator 84 integrates the speed estimation $\omega\wedge$ to compute an estimated phase $\theta\wedge$.

In this way, the phase estimator 8 performs a control, in such a manner that the voltage vector vo* provided from the voltage commander 7 is identical to the $\delta$-axis direction (or, the $\gamma$-axis component is zero), that is to say, Equation (8) described above is accomplished, to estimate the position and speed of the alternating current motor 20.

In this way, because the phase estimator 8 does not use the motor characteristic of the alternating current motor 20 as described above, the phase estimator 8 stably estimates the position and speed of the motor even if the motor characteristic (particularly, inductance value) is largely varied during an operation.

Second Embodiment

As described above, the control device 100 for the alternating current motor according to the first embodiment has been explained. Next, a control device 101 according to the second embodiment will be explained.

The control device 101 according to the second embodiment is different from the control device 100 according to the first embodiment in that the control device 101 includes a current distributor 3B instead of the current distributor 3A and the speed estimation $\omega\wedge$ provided from the phase estimator 8 is not input into the current distributor 3B. The other components of the control device 101 are the same as those of the control device 100. Therefore, for convenience of explanation, overlapping explanations are appropriately omitted and points different from the first embodiment are centrally explained. Moreover, a control block diagram of the control device 101 according to the second embodiment is not illustrated.

The current distributor 3A of the first embodiment performs a high-efficiency control by using a vibrational component generated when the alternating current motor 20 operates as a frequency of phase fluctuation of the current vector. In this case, there is an advantage that phase fluctuation is not overlapped. However, when the frequency of phase fluctuation is within a response frequency band of a speed control, the speed control responds to speed fluctuation by the phase fluctuation and thus a planned operation may not be performed. Therefore, in the second embodiment, a frequency of phase fluctuation can be optionally determined in order to solve this.

(Explanation on Current Distributor 3B)

Figure 6:
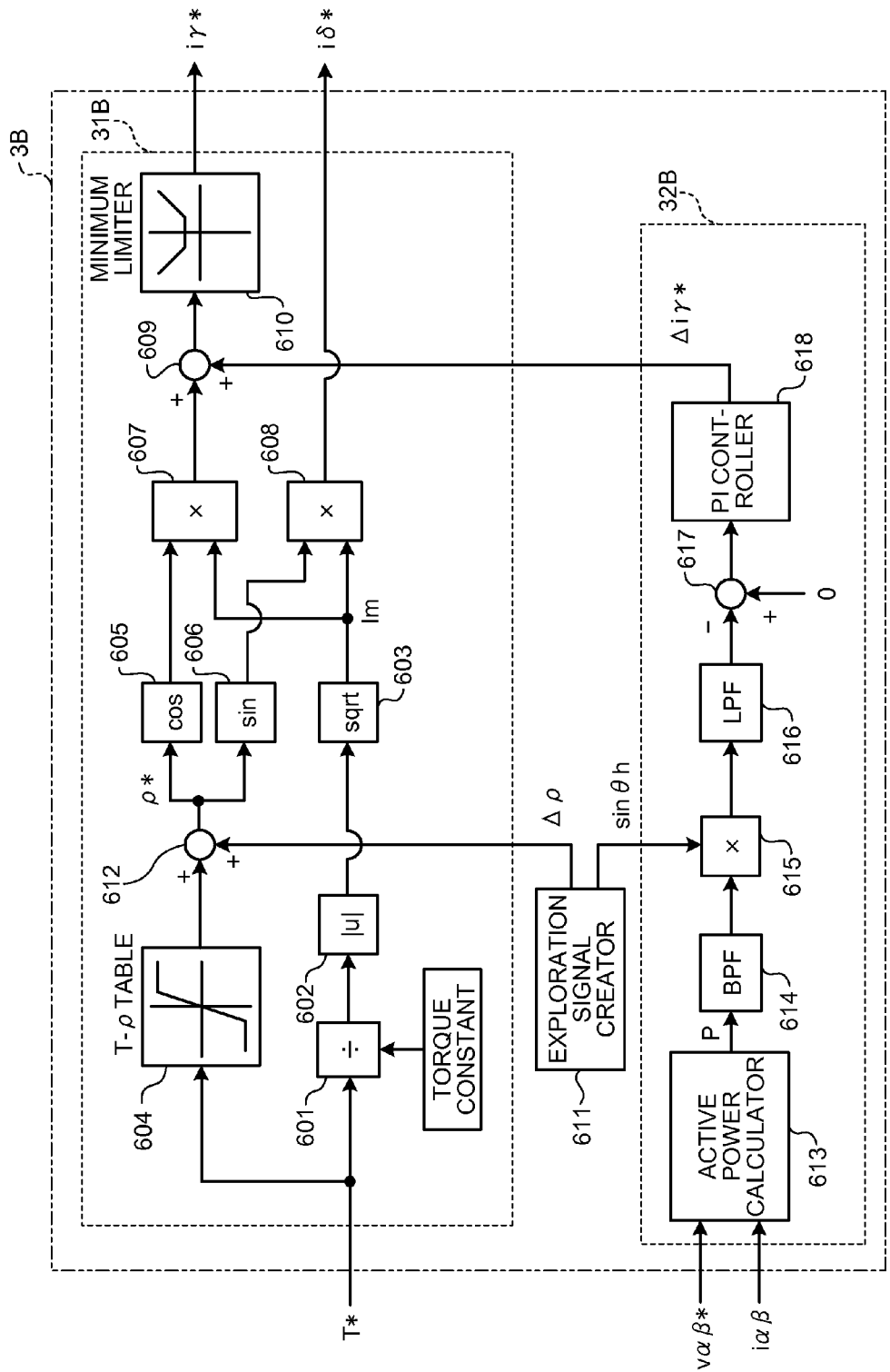
FIG. 6 is a control block diagram of a current distributor according to a second embodiment.

Next, a detailed operation of the current distributor 3B is explained with reference to FIG. 6. FIG. 6 is a control block diagram illustrating the configuration of the current distributor 3B. As illustrated in FIG. 6, the current distributor 3B includes a distribution unit 31B and a correction unit 32B similarly to the current distributor 3A.

The distribution unit 31B includes a divider 601, an absolute value calculator 602, a square root calculator 603, a T-$\rho$ table 604, a cosine calculator 605, a sine calculator 606, multipliers 607 and 608, an adder 609, a minimum limiter 610, an exploration signal creator 611, and an adder 612. The correction unit 32B includes an active power calculator 613, a bandpass filter 614, a multiplier 615, a low-pass filter 616, a subtractor 617, and a proportional integral controller (PI controller) 618.

Figure 7:
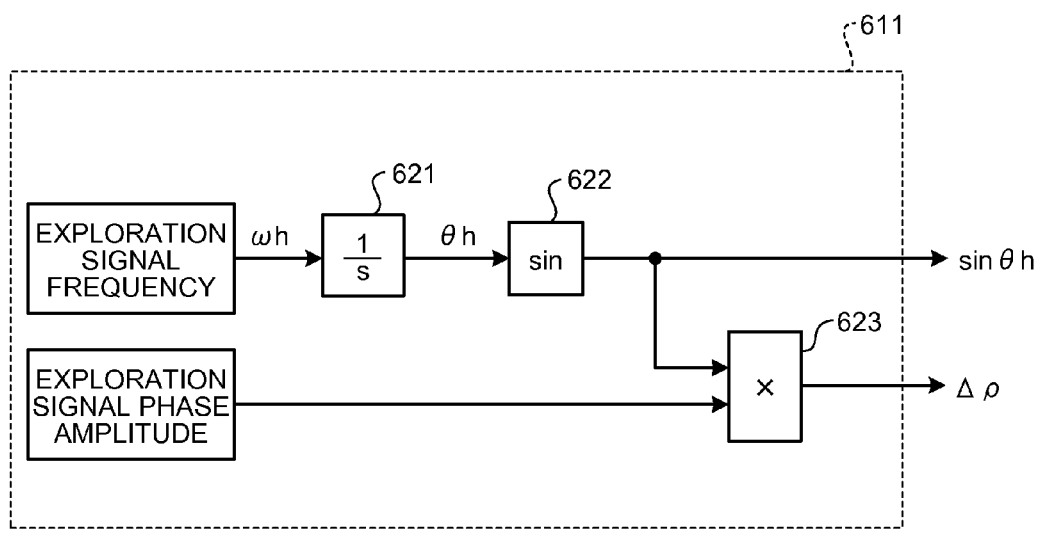
FIG. 7 is a control block diagram of an exploration signal creator according to the second embodiment.

Furthermore, as illustrated in FIG. 7, the exploration signal creator 611 includes an integrator 621, a sine calculator 622, and a multiplier 623.

The integrator 621 illustrated in FIG. 7 integrates an exploration signal frequency $\omega h$ that is a predetermined value (a phase fluctuation frequency of a current vector) to compute an exploration signal phase $\theta h$. The sine calculator 622 performs a sine calculation on the exploration signal phase $\theta h$ to compute a sine wave $\sin\theta h$ of the exploration signal phase.

The multiplier 623 multiplies a predetermined value (a phase amplitude of the exploration signal) by the sine wave $\sin \theta h$ of the exploration signal phase to compute a phase fluctuation $\Delta \rho$ of the command load angle.

Returning to FIG. 6, the adder 612 of the distribution unit 31B adds the output of the T-ρ table 604 processed similarly to the first embodiment to the phase fluctuation $\Delta \rho$ of the command load angle provided from the exploration signal creator 611 (in detail, the multiplier 623 of FIG. 7), and outputs the result to the cosine calculator 605 and the sine calculator 606 as a new command load angle $\rho^*$. After that, the distribution unit 31B computes a current command vector $i^*$ through the same process as that of the distribution unit 31A according to the first embodiment.

The active power calculator 613 of the correction unit 32B computes an active power P similarly to the first embodiment. The bandpass filter 614 receives the active power P and extracts a frequency component based on the exploration signal provided from the exploration signal creator 611. The multiplier 615 multiplies the frequency component extracted by the bandpass filter 614 by the sine wave $\sin \theta h$ of the exploration signal phase provided from the exploration signal creator 611, and the low-pass filter 616 receives the multiplication result and extracts a vibrational component dependent on the variation of the mechanical output Po by performing signal processing.

The subtractor 617 subtracts the vibrational component from a predetermined value (zero) to compute a signal of which the sign of the vibrational component is reversed. The proportional integral controller 618 receives the signal and computes a γ-axis current command correction amount $\Delta i\gamma^*$ similarly to the first embodiment. In this way, the correction unit 32B computes the γ-axis current command correction amount $\Delta i\gamma^*$ and outputs the corrected amount to the adder 609 of the distribution unit 31B. Moreover, similarly to the first embodiment, the adder 609 adds the γ-axis current command correction amount $\Delta i\gamma^*$ to the γ-axis current command $i\gamma^*$ to correct the current command.

In this way, the embodiment has a configuration that the γ-axis current command $i\gamma^*$ is corrected by the γ-axis current command correction amount $\Delta i\gamma^*$ that is calculated in such a manner that the power difference $\Delta P$ becomes the minimum by using the vibrational component of the exploration signal overlapped by the exploration signal creator 611, that is to say, a change amount of the power difference $\Delta P$ to the load angle variation.

Similarly to the first embodiment, the γ-axis current command correction amount $\Delta i\gamma^*$ is corrected to the γ-axis current command $i\gamma^*$. This performs the same operation as an operation for operating the command load angle $\rho^*$ in such a manner that the δ-axis component power to the input power becomes the maximum. The correction unit 32B may perform a calculation by using the correction angle $\Delta \rho$ to the command load angle $\rho^*$ to directly correct the command load angle. In this case, the configuration of the correction unit 32B may not be changed. Therefore, it is only sufficient that the correction unit 32B additionally has a unit conversion factor, which indicates the change from an electric current dimension to a phase angle dimension, and adds the unit conversion factor to the command load angle $\rho^*$ output from the T-ρ table 604.

In this way, even when a disturbance factor such as a dead time and an offset of a current detection is small and thus its state approximates an ideal state, a command load angle for realizing a stable high-efficiency operation can be estimated by overlapping vibrational components used for an estimated phase.

The second embodiment is performed in this way. Similarly to the first embodiment, a high efficiently operating command load angle can be estimated with respect to an estimated error of the control axis caused by a setting error of the wirewound resistance of the alternating current motor 20 and a variation of a motor characteristic depending on a load condition. Therefore, an effect of a high-efficiency operation can be more raised.

As described above, the embodiments have been explained. However, a so-called person skilled in the art can appropriately modify the embodiments without departing from the intent of the present invention. Moreover, a person skilled in the art can use appropriate combinations of the embodiments and modification examples. In other words, it is obvious that a technology that includes such a modification is also included in the technical scope of the present invention.

For example, it has been explained in the embodiments that the phase estimator 8 computes the control phase $\theta_\wedge$ and the speed estimation ωΛ and outputs the results to the controllers. However, the phase estimator 8 may output only the control phase $\theta_\wedge$. It is only sufficient that each controller calculates the speed estimation $\omega_\wedge$ as a change amount per a unit time of the control phase $\theta_\wedge$ if required.

Moreover, it has been explained that the calculation of the mechanical output Po performed by the correction unit 32A of the current distributor 3A is performed by the product of the torque command $T^*$ and the speed estimation $\omega_\wedge$. If the speed command $\omega^*$ and the speed estimation $\omega_\wedge$ are substantially identical to each other in accordance with the control performed by the speed controller 2, the calculation may be performed by the speed command $\omega^*$ or may be performed by one obtained by performing a speed response considerable low-pass filter process on the speed command $\omega^*$.

It has been explained in the embodiments that the phase estimator 8 is illustrated by the control block diagram of FIG. 5. However, the phase estimator 8 may be realized by the configurations of phase estimators 8A to 8E illustrated in FIGS. 8A to 8E.

First Alternative Example

If the phase error $\Delta\theta_\wedge$ is substantially zero, the phase estimator 8 illustrated in FIG. 5 can replace a strict inverse tangent calculation by an easy division calculation. In other words, the phase estimator 8 may function by using the divider 85 instead of the arctan calculator 81 like the phase estimator 8A illustrated in FIG. 8A.

Second Alternative Example

Figure 8A:
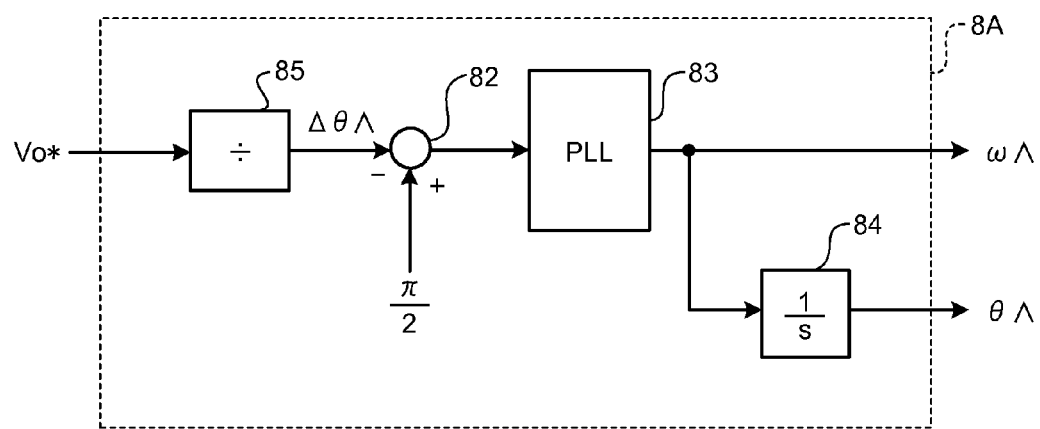
FIG. 8A is a control block diagram explaining a first alternative example of the phase estimator.
Figure 8B:
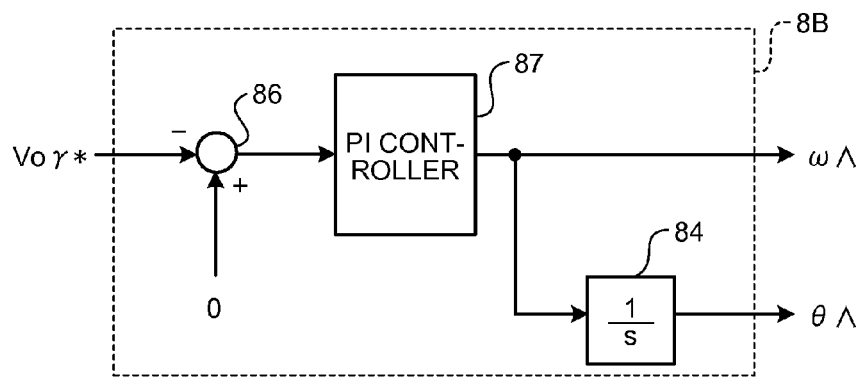
FIG. 8B is a control block diagram explaining a second alternative example of the phase estimator.

The phase estimator 8B illustrated in FIG. 8B includes a subtractor 86, a proportional integral controller 87, and an integrator 84. The subtractor 86 subtracts the γ-axis voltage $vo\gamma^*$ provided from the voltage commander 7 from the predetermined value (zero). The proportional integral controller 87 performs a control in such a manner that the γ-axis voltage $vo\gamma^*$ that is the subtraction result becomes zero directly, and outputs the control output as the speed estimation $\omega_\wedge$.

In this configuration, because the proportional integral controller 87 has different unit dimensions with respect to an input (voltage) and an output (number of rotations), the proportional integral controller 87 requires a conversion gain corresponding to a back electromotive force constant of an electric motor when designing a gain. Therefore, the example may be performed by this configuration.

Third Alternative Example

Figure 8C:
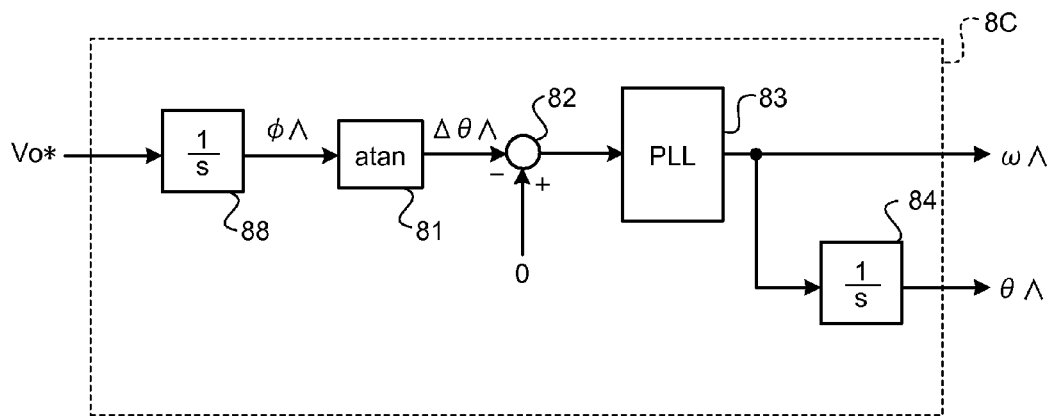
FIG. 8C is a control block diagram explaining a third alternative example of the phase estimator.

The phase estimator 8C illustrated in FIG. 8C additionally includes an integrator 88 on its input stage compared to the phase estimator 8 illustrated in FIG. 5. The integrator 88 integrates the voltage vector vo* to be input to compute a stator flux estimation vector $\phi\wedge$. The arctan calculator 81 performs Equation (14) to compute the phase error $\Delta\theta\wedge$ by using the stator flux estimation vector $\phi\wedge$. The PLL calculator 83 outputs the speed estimation con that is a control output in such a manner that the phase error $\Delta\theta\wedge$ becomes the predetermined value (zero). In this way, the third alternative example may have a configuration that the stator flux estimation vector $\phi\wedge$ is identical to the γ-axial direction (the δ-axis component becomes zero).

$$\Delta\theta\wedge = a\,\tan\!\left(\frac{\phi\delta\wedge}{\phi\gamma\wedge}\right) \tag{14}$$

Because the integrator 88 delays the phase of the voltage vector vo* by π/2 and simultaneously attenuates a high-frequency band signal, an influence caused by ripple and noise of the voltage vector vo* can be reduced.

Fourth Alternative Example

Figure 8D:
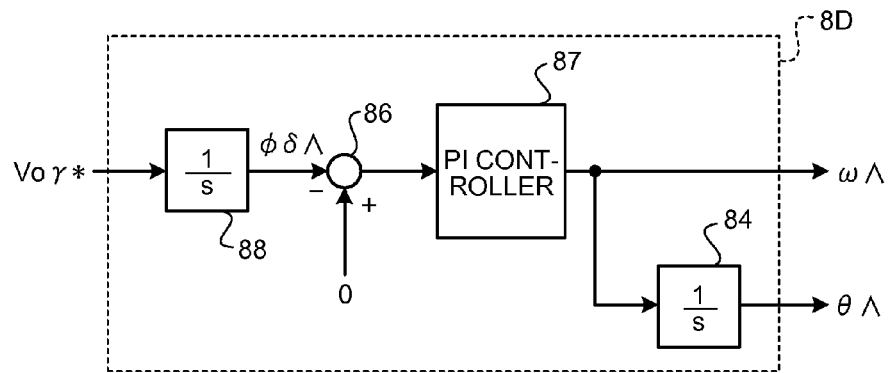
FIG. 8D is a control block diagram explaining a fourth alternative example of the phase estimator.

The phase estimator 8D illustrated in FIG. 8D additionally includes the integrator 88 on its input stage, which inputs the γ-axis voltage voγ* and computes a δ-axis stator flux estimate value $\phi\delta\wedge$. The subtractor 86 subtracts the stator flux estimate value $\phi\delta\wedge$ from the predetermined value (zero). The proportional integral controller 87 performs a control in such a manner that the subtraction result becomes zero, and outputs the control output as a speed estimation $\omega\wedge$. The example may be performed by this configuration.

Fifth Alternative Example

Figure 8E:
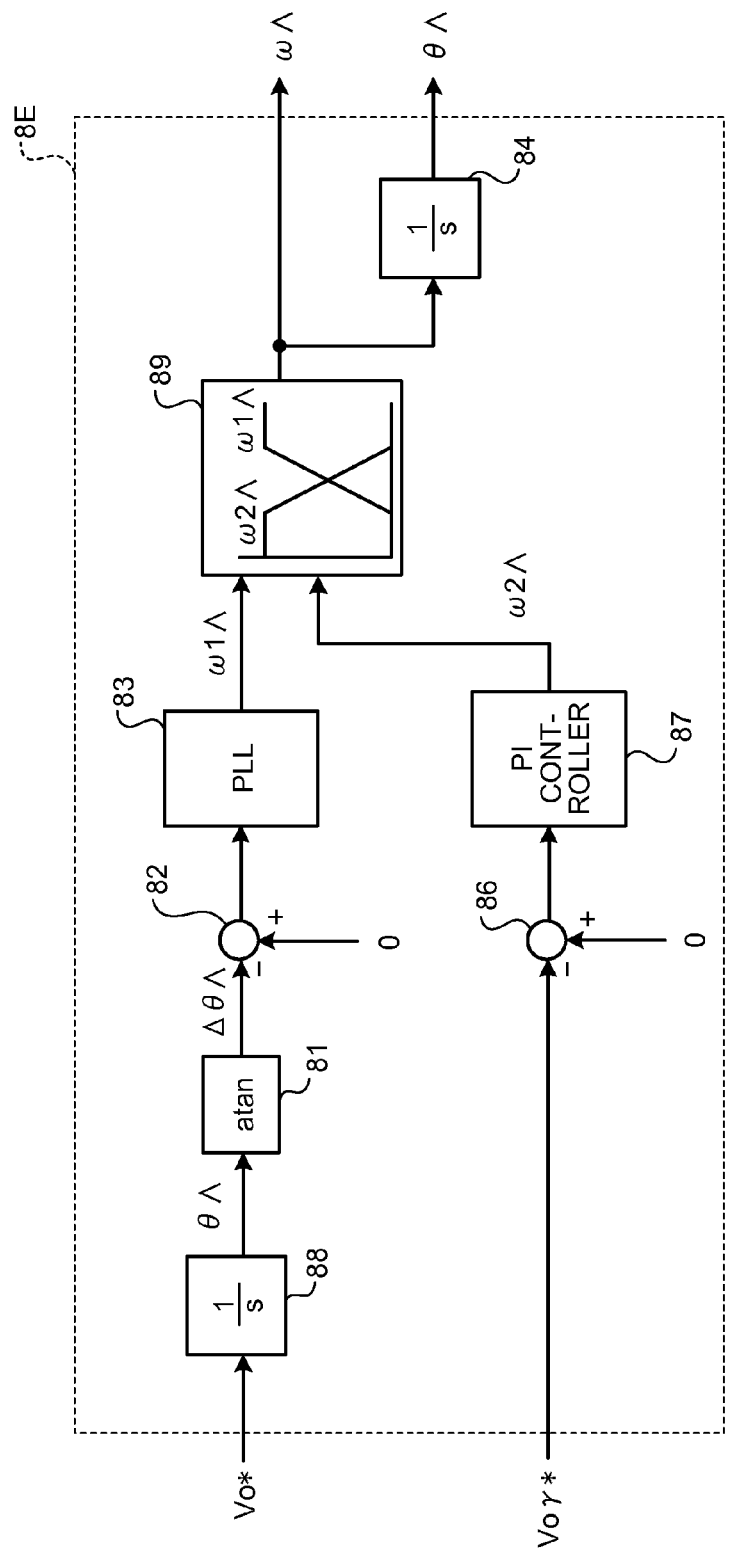
FIG. 8E is a control block diagram explaining a fifth alternative example of the phase estimator.

The phase estimator 8E illustrated in FIG. 8E may be realized by a switching configuration in which the configuration (the phase estimator 8B of FIG. 8B) for performing a control in such a manner that the voltage vector vo* is identical to the δ-axis direction (the γ-axis component becomes zero) and the configuration (the phase estimator 8C of FIG. 8C) for performing a control in such a manner that the stator flux estimation vector $\phi\wedge$ is identical to the γ-axis direction (the δ-axis component becomes zero) are smoothly switched by a weighting function 89 over online depending on an operating condition.

For example, the present example can be more effectively realized when the operating condition gives a weight to a control for according the voltage vector vo* with the δ-axis direction during low speed (the γ-axis component is zero) and a control for according the stator flux $\phi$s with the γ-axis direction during high speed (the δ-axis component is zero) in consideration of a process for removing the offset of an input signal of the integrator 88.

As described above, the control device for the alternating current motor according to the present embodiments uses the γ-δ axis as a control axis and performs a control in such a manner that the voltage vector vo* obtained by subtracting the voltage drop amount caused by the wirewound resistance from the applied voltage applied to the alternating current motor is identical to the δ-axis direction (the γ-axis component is zero) or the stator flux $\phi$s is identical to the γ-axis direction (the δ-axis component is zero). Therefore, the control device is stable with respect to a control target of which the variation of the motor characteristic is large and thus can perform a position sensorless operation. Furthermore, because a current command vector can be set to a substantially fixed value even when the power factor of the control target is not easily controlled, a robust control can be performed with high efficiency.

What is claimed is:

1. A control device for an alternating current motor comprising:
   a current distributor that computes a component that contributes to a mechanical output of the alternating current motor as a δ-axis current command and a component that does not contribute to the mechanical output as a γ-axis current command, based on a torque command;
   a converter that converts a detected value of current flowing into the alternating current motor into a δ-axis component and a γ-axis component by using a control phase;
   a current controller that performs a control in such a manner that the δ-axis current command and the γ-axis current command are respectively identical with the δ-axis component current and the γ-axis component current flowing into the alternating current motor;
   a voltage drop calculator that calculates a voltage drop amount of inductance and wirewound resistance of the alternating current motor;
   a voltage commander that outputs a voltage command for the alternating current motor on the basis of an output of the current controller and an output of the voltage drop calculator;
   a phase estimator that computes at least one of a phase at which a γ-axis component of an addition amount of the output of the current controller and a voltage drop amount of the inductance becomes zero and a phase at which a δ-axis component obtained by integrating the addition amount becomes zero and outputs the computed phase as the control phase; and
   an inverter circuit that applies a voltage based on the voltage command to the alternating current motor.

2. The control device for the alternating current motor according to claim 1, wherein
   the current distributor includes:
     a distribution unit that receives the torque command and calculates the δ-axis current command and the γ-axis current command on the basis of a command phase angle to the torque command and a torque constant of the alternating current motor; and
     a correction unit that performs a control in such a manner that a vibrational component of a power difference between an active power output of the alternating current motor and the mechanical output of the alternating current motor becomes zero to compute a phase correction amount, and
   the phase correction amount is used to correct the command phase angle.

3. The control device for the alternating current motor according to claim 2, wherein
   the voltage commander includes a voltage error compensator that computes an electric current flowing into the alternating current motor as a current estimation by using the voltage command for the alternating current motor and the voltage drop amount of the inductance and the wirewound resistance of the alternating current motor and outputs a voltage error computed in such a manner that the current estimation is identical with a current that flows into the alternating current motor, and
   the voltage error is used to compensate the voltage command.

4. The control device for the alternating current motor according to claim 2, wherein the phase estimator outputs a change amount per a unit time of the control phase as a speed estimation of the alternating current motor, and the control device further comprises a speed controller that performs a control in such a manner that a speed command for the alternating current motor is identical with the speed estimation to output the torque command.

5. The control device for the alternating current motor according to claim 1, wherein the current distributor includes:

a distribution unit that receives the torque command and calculates the δ-axis current command and the γ-axis current command on the basis of a command phase angle to the torque command and a torque constant of the alternating current motor; and a correction unit that performs a control in such a manner that a vibrational component of a power difference between an active power output of the alternating current motor and the mechanical output of the alternating current motor becomes zero to compute a γ-axis current correction amount, and the γ-axis current correction amount is used to correct the γ-axis current command.

6. The control device for the alternating current motor according to claim 5, wherein the voltage commander includes a voltage error compensator that computes an electric current flowing into the alternating current motor as a current estimation by using the voltage command for the alternating current motor and the voltage drop amount of the inductance and the wirewound resistance of the alternating current motor and outputs a voltage error computed in such a manner that the current estimation is identical with a current that flows into the alternating current motor, and the voltage error is used to compensate the voltage command.

7. The control device for the alternating current motor according to claim 5, wherein the phase estimator outputs a change amount per a unit time of the control phase as a speed estimation of the alternating current motor, and the control device further comprises a speed controller that performs a control in such a manner that a speed command for the alternating current motor is identical with the speed estimation to output the torque command.

8. The control device for the alternating current motor according to claim 1, wherein the current distributor includes:

a distribution unit that receives the torque command and calculates the δ-axis current command and the γ-axis current command on the basis of a command phase angle to the torque command and a torque constant of the alternating current motor;

an exploration signal creator that overlaps a high-frequency signal on the command phase angle to give phase fluctuation; and a correction unit that performs a control in such a manner that a frequency component of the high-frequency signal of an active power output of the alternating current motor becomes zero to compute a phase correction amount, and the phase correction amount is used to correct the command phase angle.

9. The control device for the alternating current motor according to claim 8, wherein the voltage commander includes a voltage error compensator that computes an electric current flowing into the alternating current motor as a current estimation by using the voltage command for the alternating current motor and the voltage drop amount of the inductance and the wirewound resistance of the alternating current motor and outputs a voltage error computed in such a manner that the current estimation is identical with a current that flows into the alternating current motor, and the voltage error is used to compensate the voltage command.

10. The control device for the alternating current motor according to claim 8, wherein the phase estimator outputs a change amount per a unit time of the control phase as a speed estimation of the alternating current motor, and the control device further comprises a speed controller that performs a control in such a manner that a speed command for the alternating current motor is identical with the speed estimation to output the torque command.

11. The control device for the alternating current motor according to claim 1, wherein the current distributor includes:

a distribution unit that receives the torque command and calculates the δ-axis current command and the γ-axis current command on the basis of a command phase angle to the torque command and a torque constant of the alternating current motor;

an exploration signal creator that overlaps a high-frequency signal on the command phase angle to give phase fluctuation; and a correction unit that performs a control in such a manner that a frequency component of the high-frequency signal of an active power output of the alternating current motor becomes zero to compute a γ-axis current correction amount, and the γ-axis current correction amount is used to correct the γ-axis current command.

12. The control device for the alternating current motor according to claim 11, wherein the voltage commander includes a voltage error compensator that computes an electric current flowing into the alternating current motor as a current estimation by using the voltage command for the alternating current motor and the voltage drop amount of the inductance and the wirewound resistance of the alternating current motor and outputs a voltage error computed in such a manner that the current estimation is identical with a current that flows into the alternating current motor, and the voltage error is used to compensate the voltage command.

13. The control device for the alternating current motor according to claim 11, wherein the phase estimator outputs a change amount per a unit time of the control phase as a speed estimation of the alternating current motor, and the control device further comprises a speed controller that performs a control in such a manner that a speed command for the alternating current motor is identical with the speed estimation to output the torque command.

14. The control device for the alternating current motor according to claim 1, wherein the voltage commander includes a voltage error compensator that computes an electric current flowing into the alternating current motor as a current estimation by using the voltage command for the alternating current motor and the voltage drop amount of the inductance and the wirewound resistance of the alternating current motor and outputs a voltage error computed in such a manner that the current estimation is identical with a current that flows into the alternating current motor, and the voltage error is used to compensate the voltage command.

15. The control device for the alternating current motor according to claim 14, wherein
the phase estimator outputs a change amount per a unit time of the control phase as a speed estimation of the alternating current motor, and
the control device further comprises a speed controller that performs a control in such a manner that a speed command for the alternating current motor is identical with the speed estimation to output the torque command.

16. The control device for the alternating current motor according to claim 1, wherein
the phase estimator outputs a change amount per a unit time of the control phase as a speed estimation of the alternating current motor, and
the control device further comprises a speed controller that performs a control in such a manner that a speed command for the alternating current motor is identical with the speed estimation to output the torque command.

17. A control device for an alternating current motor comprising:
a current distribution means that computes a component that contributes to a mechanical output of the alternating current motor as a $\delta$-axis current command and a component that does not contribute to the mechanical output as a $\gamma$-axis current command, based on a torque command;
a conversion means that converts a detected value of current flowing into the alternating current motor into a $\delta$-axis component and a $\gamma$-axis component by using a control phase;
a current control means that performs a control in such a manner that the $\delta$-axis current command and the $\gamma$-axis current command are respectively identical with the $\delta$-axis component and the $\gamma$-axis component;
a voltage drop calculation means that calculates a voltage drop amount of inductance and wirewound resistance of the alternating current motor;
a voltage command means that outputs a voltage command for the alternating current motor on the basis of an output of the current control means and an output of the voltage drop calculation means;
a phase estimation means that computes at least one of a phase at which a $\gamma$-axis component of an addition amount of the output of the current control means and a voltage drop amount of the inductance becomes zero and a phase at which a $\delta$-axis component obtained by integrating the addition amount becomes zero and outputs the computed phase as the control phase; and
a voltage output means that applies a voltage based on the voltage command to the alternating current motor.

* * * * *